United States Patent
Keller et al.

(10) Patent No.: US 9,294,964 B2
(45) Date of Patent: Mar. 22, 2016

(54) HANDOVER DELAY OPTIMIZATION

(75) Inventors: Ralf Keller, Würselen (DE); Magnus Hallenstål, Täby (SE); Fredrik Lindholm, Älvsjö (SE); Magnus Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 548 days.

(21) Appl. No.: 12/943,310

(22) Filed: Nov. 10, 2010

(65) Prior Publication Data

US 2011/0110331 A1 May 12, 2011

Related U.S. Application Data

(60) Provisional application No. 61/259,709, filed on Nov. 10, 2009.

(30) Foreign Application Priority Data

Nov. 9, 2010 (WO) .................. PCT/EP2010/067150

(51) Int. Cl.
*H04W 4/00* (2009.01)
*H04W 36/00* (2009.01)
*H04M 7/12* (2006.01)
*H04L 29/06* (2006.01)
*H04W 76/02* (2009.01)
*H04W 80/10* (2009.01)

(52) U.S. Cl.
CPC ......... *H04W 36/0011* (2013.01); *H04L 65/103* (2013.01); *H04L 65/1016* (2013.01); *H04M 7/1205* (2013.01); *H04W 36/0022* (2013.01); *H04W 76/022* (2013.01); *H04W 80/10* (2013.01)

(58) Field of Classification Search
USPC .......... 370/252, 254, 328, 331, 360, 400, 401
See application file for complete search history.

(56) References Cited

U.S. PATENT DOCUMENTS

| 8,340,626 B2 * | 12/2012 | Edge ................... H04M 7/0078 455/404.1 |
| 2006/0286984 A1 * | 12/2006 | Bonner ........................ 455/445 |
| 2007/0149166 A1 | 6/2007 | Turcotte et al. |

(Continued)

FOREIGN PATENT DOCUMENTS

| JP | 2008306384 A | 12/2008 |
| WO | 2007045264 A1 | 4/2007 |

(Continued)

OTHER PUBLICATIONS

3rd Generation Partnership Project. 3GPP TS 23.216, V8.5.0 (Sep. 2009). 3rd Generation Partnership Project; Technical Specification Group Services and System Aspects; Single Radio Voice Call Continuity (SRVCC); Stage 2 (Release 8). Sep. 2009.

(Continued)

*Primary Examiner* — Yemane Mesfin
*Assistant Examiner* — Mon Cheri Davenport
(74) *Attorney, Agent, or Firm* — Coats & Bennett, PLLC (57) ABSTRACT

A method of anchoring a packet switched session of a subscriber comprises receiving a packet switched request for a session setup, and anchoring the packet switched session in a control node (MSC-S) of a visited network of the subscriber.

33 Claims, 6 Drawing Sheets

(56) References Cited

U.S. PATENT DOCUMENTS

| | | | |
|---|---|---|---|
| 2008/0186921 A1* | 8/2008 | Long et al. | 370/331 |
| 2008/0267128 A1* | 10/2008 | Bennett et al. | 370/331 |
| 2009/0034472 A1* | 2/2009 | Purnadi et al. | 370/331 |
| 2010/0008340 A1 | 1/2010 | Li et al. | |
| 2011/0165856 A1* | 7/2011 | You et al. | 455/404.1 |
| 2011/0299429 A1* | 12/2011 | Tiwari | 370/259 |

FOREIGN PATENT DOCUMENTS

| | | |
|---|---|---|
| WO | 2008/023162 A2 | 2/2008 |
| WO | 2008028378 A1 | 3/2008 |
| WO | 2009089987 A1 | 7/2009 |

OTHER PUBLICATIONS

Krishnan, S. et al. "An IETF-based Evolved Packet System beyond the 3GPP Release 8." CTIA 2008. Available online at: http://www1.ericsson.com/res/thecompany/docs/journal_conference_papers/packet_technologies/Beyond_R8_EPS.pdf.

3rd Generation Partnership Project. 3GPP TS 23.228, V9.1.0 (Sep. 2009). 3rd Generation Partnership Project; Technical Specification Group Services and System Aspects; IP Multimedia Subsystem (IMS); Stage 2 (Release 9). Sep. 2009.

3rd Generation Partnership Project, "Technical Specification Group Services and System Aspects; IP Multimedia Subsystem (IMS) centralized services; Stage 2 (Release 9)", 3GPP TS 23.292 V9.3.0, Sep. 2009, pp. 1-106.

3rd Generation Partnership Project, "Technical Specification Group Services and Architecture; IP Multimedia Subsystem (IMS) Service Continuity; Stage 2 (Release 9)", 3GPP TS 23.237 V9.2.0, Sep. 2009, pp. 1-88.

3rd Generation Partnership Project, "Technical Specification Group Services and System Aspects; Circuit Switched Fallback in Evolved Packet System; Stage 2 (Release 9)", 3GPP TS 23.272 V9.1.0, Sep. 2009, pp. 1-60.

* cited by examiner

HANDOVER DELAY OPTIMIZATION

RELATED APPLICATIONS

This application claims priority to U.S. Provisional Patent Application Ser. No. 61/259,709 filed Nov. 10, 2009, and International Application No. PCT/EP2010/067150 filed Nov. 9, 2010, both of which are incorporated herein by reference in their entirety.

TECHNICAL FIELD

The invention relates to telecommunications, particularly to a handover delay optimization, and further particularly to a session transfer delay optimization.

BACKGROUND

Mobile networks are currently evolving from pure circuit switched (CS) networks towards IP based networks, and by that integrating into IP based infrastructures that are also used for the Internet, the World Wide Web and the datacom industry.

With this trend mobile networks closely follow the evolution steps of the wireline networks, where Voice over Internet Protocol (VoIP) via Digital Subscriber Line (DSL) access or via Wireless Local Are Network (WLAN) access is existing technology today.

Mobile operators that install IP Multimedia Subsystem (IMS) networks and offer IMS services want to make these services available also to Global Systems for Mobile Communications (GSM)/Wideband Code Division Multiple Access (WCDMA) subscribers. Hereto, calls from and to this group of GSM/WCDMA subscribers are routed through the IMS network, in order for the IMS service engine to execute the call and call related services. This concept is called IMS Centralized Services (ICS). The IMS centralized Services work item in the 3$^{rd}$ Generation Partnership Program (3GPP) targets at using the CS access for access to IMS services (for example, 3GPP Technical Specification 23.292), and is complemented by IMS Service Continuity (for example, 3GPP Technical Specification 23.237).

In parallel to the ICS trend the packet core is evolving (Evolved Packet Core, EPC) as part of the Evolved Packet System (EPS), supporting EUTRAN (or LTE as it also is denoted) as new radio access network. As part of this discussion, work on Single Radio Voice Call Continuity (SRVCC) is ongoing in 3GPP SA2 (for example 3GPP Technical Specification 23.216), enabling inter domain Handover (HO) of an IMS voice call from packet switched (PS) domain to circuit switched (CS) domain. It is presumed that also the return direction might be standardized in later releases of the standard. The inter domain HO is one step of a complete session transfer in SRVCC, the second step moves the IMS session from a PS access to a CS access, this is done in the SCC AS specified in above mentioned IMS Service continuity specification.

Figure 1:
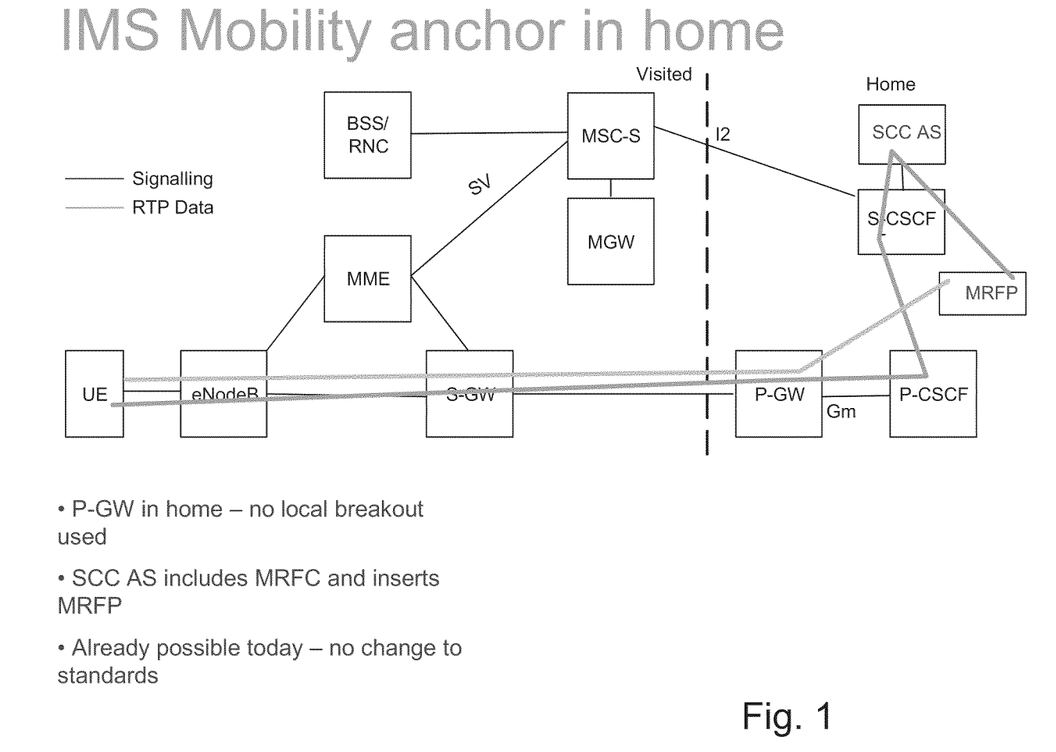
FIG. 1 is a block diagram illustrating a communications architecture used during a call being anchored in a home network of a subscriber.

Referring to FIG. 1, a known communications architecture used during a session or a call being anchored in a home network of a subscriber will be described in the following. The communications architecture may be known from the 3GPP Technical Specifications 23.237 and 23.216.

A subscriber UE is registered in IMS via a LTE or UTRAN HSPA access network. The call of the UE is anchored in a Service Centralization and Continuity Application Server (SCC AS) of the IMS. The access network and the IMS, in which the call is anchored, is referred to as a home network or home domain of the subscriber.

A visited network or a visited domain to which the subscriber may roam comprises either a GERAN or UTRAN access network and a LTE or UTRAN HSPA access network and a core network comprising at least one Mobile Switching Center Server (MSC-S) and at least one Media Gateway (MGW).

Call control signaling is carried from the visited domain via the eNodeB and Serving Gateway (S-GW) and PDN-GW to the IMS (which comprises a P-CSCF, a S-CSCF and a SCC AS at least) and vice versa. The media is transported via the eNodeB and Serving Gateway (S-GW) and PDN-GW to the remote end, whereby the remote end is an IMS terminal or any other media handling device e.g. a Media Resource Function Processor (MRFP), and vice versa.

However, the current SRVCC solution foresees that the SCC AS, which is the mobility anchor point for the session from a IMS control plane point of view, is in the home domain, also when the subscriber is roaming. The media anchor is really the remote end. This kind of communications architecture may results in a bad se ice experience which may be deduced from the following:

During the session transfer a SIP signaling carrying SDP swill have to be routed back to the home network and then all the way to the remote end in order for the media path to change. This is done by means of changing the ports on the media plane.

A possible solution to remedy this problem may be that the SCC AS inserts a Multimedia Resource Function Control (MRFC) in the home IMS network. The MRFC will insert a MRFP in the media path, in order to minimize a time delay which is introduced by updating the remote end as described previous (particular information as to a further subscriber being called), however, also in this case the SCC AS the MRFC and MRFP would be in the home network of the subscriber.

It may be worth noted that it is not possible to use an IMS entity of a visited network for this purpose; the subscriber has to use the IMS of the home network.

SUMMARY

It is an object of the invention to provide a method of anchoring a packet switched session of a subscriber, a control node for anchoring a packet switched session of a subscriber, a method of performing a handover of a session of a subscriber from a packet switched access to a circuit switched access, and a control node for performing a handover of a session of a subscriber from a packet switched access to a circuit switched access with enhances characteristics.

The object may be achieved by the subject-matter of the independent claims. Advantageous embodiments are described in the further claims.

Embodiments of the invention provide a transfer functionality, particularly an access transfer functionality, in the visited network, and more explicitly provide the transfer functionality by the serving MSC server in the visited network. The media may then also be anchored in the MGW controlled by the MSC server. The SCC AS in the home network may be involved to find the access transfer function and route the SIP messages to the correct or suitable MSC server in the visited network.

According to an exemplary aspect of the invention, a method of anchoring a packet switched session of a subscriber may be provided. The method may comprise receiving a packet switched request for a session setup, and anchoring the packet switched session in a control node of a visited network of the subscriber.

According to another exemplary aspect of the invention, a control node for anchoring a packet switched session of a subscriber may be provided. The control node may comprise a receiving unit for receiving a packet switched request for a session setup, and an anchoring unit for anchoring the packet switched session in a control node of a visited network of the subscriber.

According to another exemplary aspect of the invention, a method of performing a handover of a session of a subscriber from a packet switched access to a circuit switched access is provided. The method comprises receiving a handover request, and instructing a transmission node to transfer a source access leg of the session associated with the packet switched access to a target access leg of the session associated with the circuit switched access.

According to another exemplary aspect of the invention, a control node for performing a handover of a session of a subscriber from a packet switched access to a circuit switched access is provided. The control node comprises a receiving unit for receiving a handover request, and an instructing unit for instructing a transmission node to transfer a source access leg of the session associated with the packet switched access to a target access leg of the session associated with the circuit switched access.

In the context of this application, the terms "subscriber", "user", "user equipment", "UE" and terminal may be used in a mutually exchangeable way. In particular, a subscriber or a user may particularly denote a person who may use a user equipment (which may be referred to by the abbreviation "UE") or a terminal to subscribe in any service, particularly in IMS. In particular, a user equipment may be a telecommunications device such as a mobile phone which may be used during communications with further telecommunications devices or entities which may be used during a communication establishment or an ongoing telecommunications session call.

The term "anchoring a session" may particularly denote procedures with which a session may be established in such a way that an access leg of the session may be between a UE and an anchoring point, and a remote leg of the session may be between the anchoring point and a remote end. In particular, an anchoring point may associate to a service functionality located in a visited network of a subscriber. In particular, an anchoring point may be a Visited Access Transfer Function which may be located in or associated with a Mobile Switching Center Server.

The term "home network" may particularly denote a network to which a UE may perform an IMS registration. In particular, the home network may keep record of subscriber data. In particular, a "home network" of a subscriber may be identical to a "home domain" of the subscriber.

The term "visited network" may particularly denote a network to which a subscriber may roam. The term "visited network" may be identical to a home network if the UE is not roaming.

The term "handover of a session of a subscriber from a packet switched access to a circuit switched access" may particularly denote a session transfer of a subscriber from a packet switched access to a circuit switched access.

The term "handover request" may particularly denote a "SRVCC PS to CS handover request" or an "access transfer request". In particular, in the context of the application, a "SRVCC PS to CS handover request" and an "access transfer request" may be identical to one another.

BRIEF DESCRIPTION OF THE DRAWINGS

Embodiments of the invention will be described in more detail hereinafter with reference to examples but to which the scope of the invention is not limited.

DETAILED DESCRIPTION

Illustrations in the accompanying drawings are schematic. In different drawings, similar or identical elements are provided with the same reference signs or with the same abbreviations.

Figure 2:
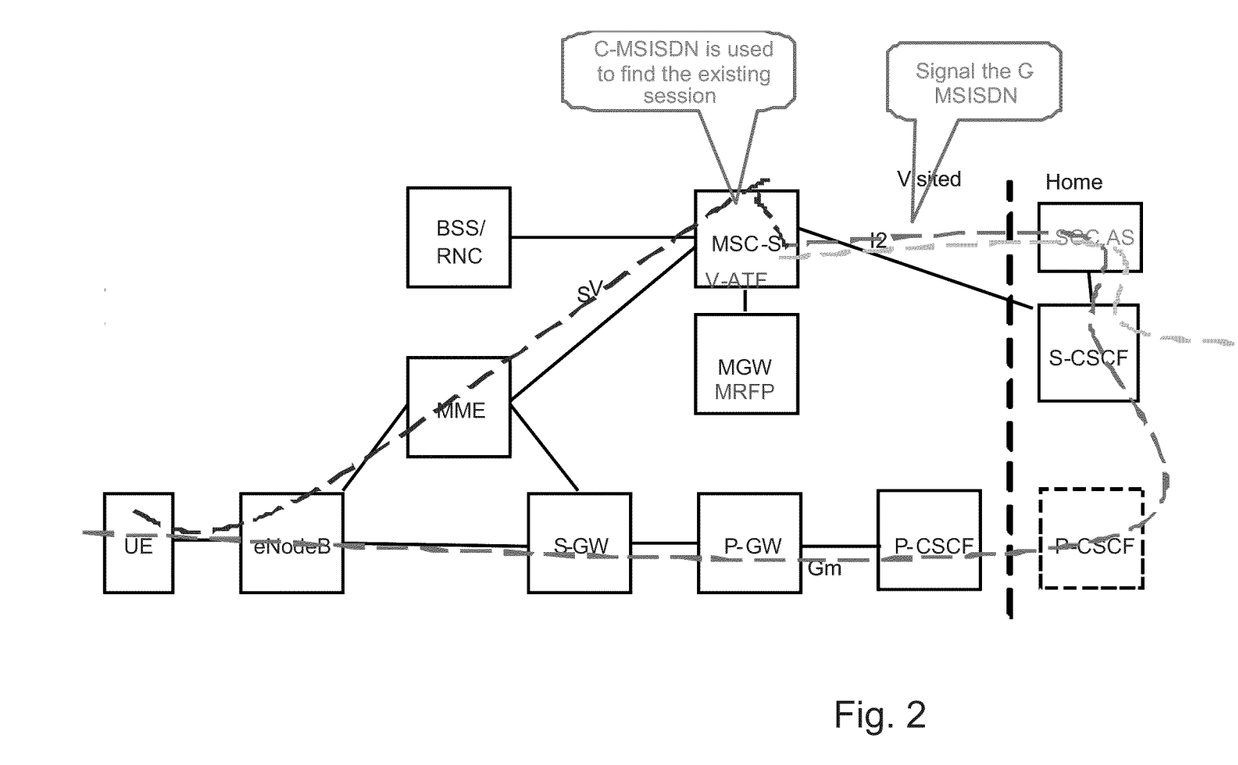
FIG. 2. is a block diagram illustrating a communications architecture used during a call being anchored in a visited network of a subscriber according to an exemplary embodiment of the invention.

Referring to FIG. 2, a communications architecture according to an exemplary embodiment of the invention will be described in the following.

The communications architecture of FIG. 2 is similar in some respects to the communications architecture of FIG. 1.

A UE is attached to IMS via a LTE access network in the visited network. The call of the UE is anchored in a SCC AS in the IMS in the home network.

A UE may perform handover between different access networks of the visited network, particular from a packet-switched to a circuit-switched access network. These networks are in the shown embodiment GERAN/UTRAN/EU-TRAN.

A Mobile Switching center Server (MSC-S) of the visited network comprises as service functionality, a Visited Access Transfer Function, and a Media Gateway MGW comprises MRFP functionality. The SCC AS in the home network can signal to the MSC-S in the visited network and vice versa for session establishment to include the MSC-S into the signaling path and the MGW into the media path. A MME may signal to the MSC-S mobility related signaling to perform handover between the packet-switched and circuit-switched access.

Figure 3:
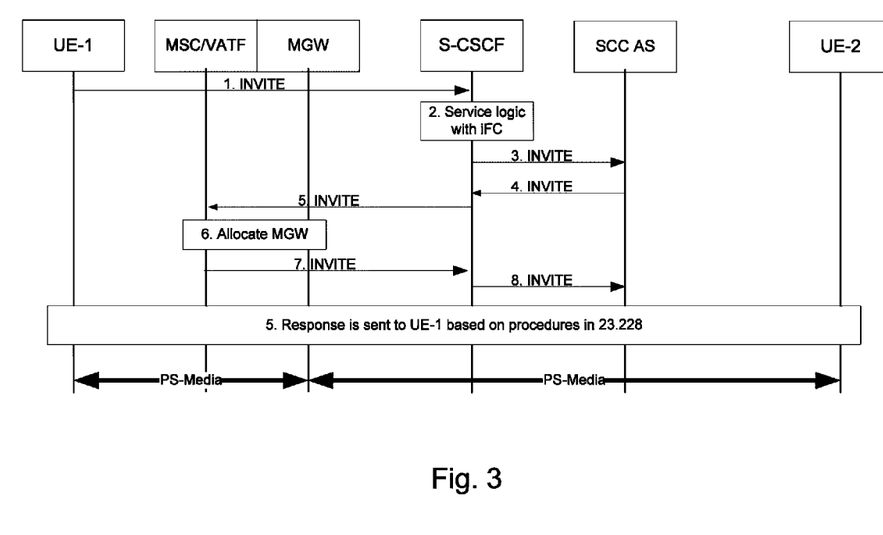
FIG. 3 is a flow diagram illustrating a method of anchoring a packet switched session of a subscriber according to an exemplary embodiment of the invention.

Referring to FIG. 3, establishing a session of a subscriber in a packet switched home network will be described in the following. Here, the SCC AS anchors the session in the VATF which is located within the MSC-S.

Existing Mobile Origination procedures described in the 3GPP Technical Specification 23.228 are used to establish the session of the subscriber.

The subscriber, now denoted with the reference sign UE-1, initiates an IMS multimedia session to a remote subscriber UE-2 and uses only PS media flow(s). The request of the subscriber UE-1 is forwarded to the S-CSCF of the home network following or based on normal IMS session set up procedures (depicted in FIG. 3 by a step 1).

The service logic with iFC of the S-CSCF causes the request to be forwarded to the SCC AS of the home network for first anchoring the session (depicted in FIG. 3 by steps 2 and 3).

The SCC AS further anchors the session in the MSC Server/VATF for both signaling traffic and media traffic (depicted in FIG. 3 by steps 4 to 8) to enable session transfer. To this end, the SCC AS sends corresponding information to the S-CSCF which in turn is forwarded by the S-CSCF to the MSC Server. The media traffic is anchored in a MGW of the visited network in that the identified MSC Server/VATF allocates the MGW to be used for transmitting the media traffic.

In order to enable the SCC AS anchoring the session in the MSC Server, the SCC AS identifies or finds the correct MSC server/VATF to route the traffic to by one of the following procedures:

In a first procedure, a pre-configured Public Service Identity (PSI) to the MSC Server is used based on the serving network in which the subscriber UE-1 is currently roaming. Here, the SCC AS may use e.g., the P-access-network-info header or the P-visited-network-info header to determine the network in which the subscriber UE-1 is currently registered. It is then up to the visited network, to ensure that the session is anchored in an MSC Server which can handle the subscriber. This could be done with procedures similar to those defined for dynamic user allocation to application servers. I.e., a "load balancing/MSC server selection" function (MSF) in the visited network is used for selecting the MSC server. The MSF, based on the Correlation Mobile Station International ISDN Number (C-MSISDN) and/or the International Mobile Subscriber Identity (IMSI), selects an appropriate MSC server instance. The selection may be based on the C-MSISDN and optionally on the IMSI. One may note that the same distribution function/MSF may be used in the MME to select the MSC server to establish the Sv reference point as shown in FIG. 2.

Additionally or alternatively, in a second procedure, the SCC AS identifies the MSC Server to which the subscriber UE-1 is allocated (in case it is) by requesting a Mobile Station Roaming Number (MSRN) of the subscriber UE-1 from at least one of the Home Location Register (HLR) and the Home Subscriber Server (HSS) of the home network. The MSRN may then be used to anchor the signaling in the MSC-S.

It may be noted that in case the terminal or the subscriber UE-1 is using Short Message Service (SMS) over SGs, as is specified in the 3GPP Technical Specification 23.272, the subscriber UE-1 is allocated to a MSC Server while camping on LTE.

The SCC AS includes at least one of the C-MSISDN and the IMSI for the subscriber UE-1 when anchoring the session in the MSC Server/VATF. In particular, the SCC AS includes the C-MSISDN and optionally the IMSI. Additionally and alternatively, the SCC AS may include the International Mobile Equipment Identity (IMEI). The C-MSISDN is used by the VATF as correlation identifier to correlate an incoming handover request from the MME which includes the C-MSISDN with the ongoing.

It may be further noted that sending invitation information from the S-CSCF to the MSC Server/VATF and sending further invitation information from the MSC Server/VATF (depicted in FIG. 3 by steps 5 and 7, respectively) may be via a Media Gateway Control Function (MGCF), with ISDN Iser Part (ISUP) or Bearer Independent Call Control (BICC) protocol signaling between the MSC Server and the MGCF within IMS in home network.

It may be further noted that anchoring a session may mean that the access leg of the session is between the UE-1 and the MSC Server/VATF, while the remote leg of the session for signaling is between the MSC Server/VATF and the SCC AS in the home network.

The SCC AS completes the session setup to the subscriber UE-2 and sends a response to the subscriber UE-1 (depicted in FIG. 3 by a step 9).

The MSF can include a number of different values for selection of the MSC Server/VATF and is not restricted to at least one of the MSISDN and the IMSI, but may also comprise e.g., a Visitor Location Register Temporary Mobile Subscriber Identity (VLR TMSI) and a Location Area Identity (LAI). This may then require that the subscriber UE-1 is adapted to provide the corresponding information over the SIP signaling.

The selected VATF needs to be in the signaling path for the duration of the call. This may require that, if SGs is used, then the new selected MME needs to establish SGs reference points to the same MSC Sever/VATF. This may be done by including the MSC Server Identity (MSC ID) into the selection algorithm (MSF) and the MSC ID also needs to be comprised in the context for the inter MME handover.

Figure 4:
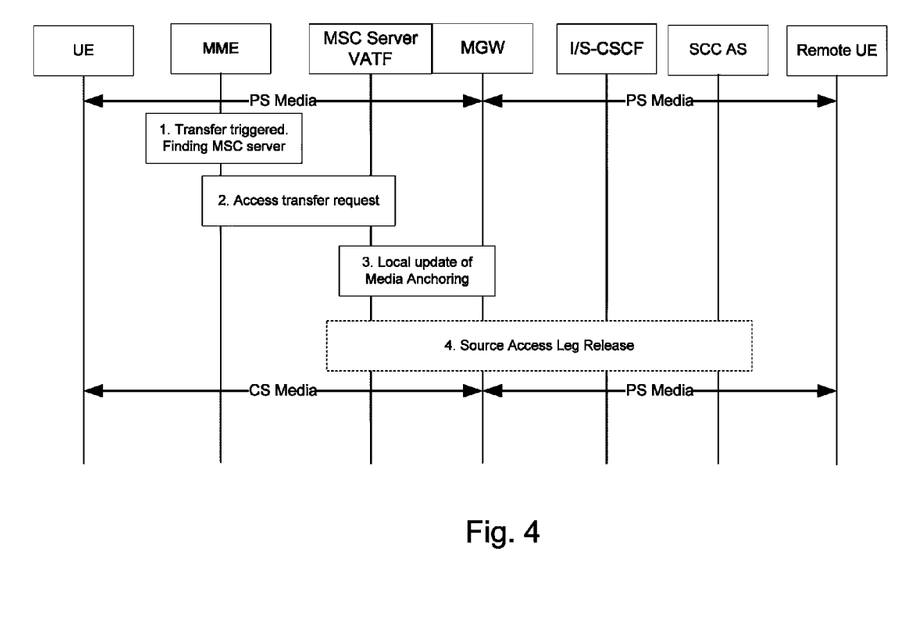
FIG. 4 is a flow diagram illustrating a method of performing a handover of a session of a subscriber from a packet switched access to a circuit switched access according to an exemplary embodiment of the invention.

Referring to FIG. 4, a transfer of a session from a PS access network of a subscriber to a CS access network will be described in the following.

More precisely, the following section describes the high level or advanced procedures for an access transfer when using a VATF function in the visited network.

Procedures specified in the 3GPP Technical Specification 23.216 [10], clause 6.2.2.1, result in that the MME will, based on the C-MSISDN/IMSI, determine the correct MSC Server which is currently anchoring a session of a subscriber UE-1 (denoted in FIG. 3A as UE) (depicted in FIG. 4 by steps 1 and 2, respectively). In addition to existing procedures, the MME may use the same type of distribution function (MSF) as described above with respect to FIG. 3 to find the correct MSC server.

The MSC Server receives a handover request from the MME (depicted in FIG. 4 by a step 2).

The MSC Server updates the media anchoring in the MGW to send and receive the media towards the target access leg (CS leg) (depicted in FIG. 4 by a step 3) and to stop the media towards the source access leg. At this point, no extra signaling is needed within the IMS network.

It may be noted that the MSC server may instruct the MGW to send media both on the source access leg and the new target access leg for a certain period of time, in order to minimize the interruption delay further (using a so called Bi-casting).

The source access leg may be then released (depicted in FIG. 4 by a step 4).

In the following, the impact on the network will be described.

A SCC AS (of a home network of a subscriber) may need a new functionality to find the access transfer function in a visited network.

A MME may he impacted with a new functionality to determine a MSC server which the subscriber is currently using (in particular when the subscriber may have not been attached in CS).

A MSC server may need to have special procedure to correlate an ongoing session/call with an incoming handover request from a MME, and during a period of time, may ensure that the MGW may send media to both a PS and CS leg.

A MGW may be already included in the media path prior to a handover, hence the codec may be selected during a session establishment. There may be no need to change a codec after SRVCC.

Figure 5:
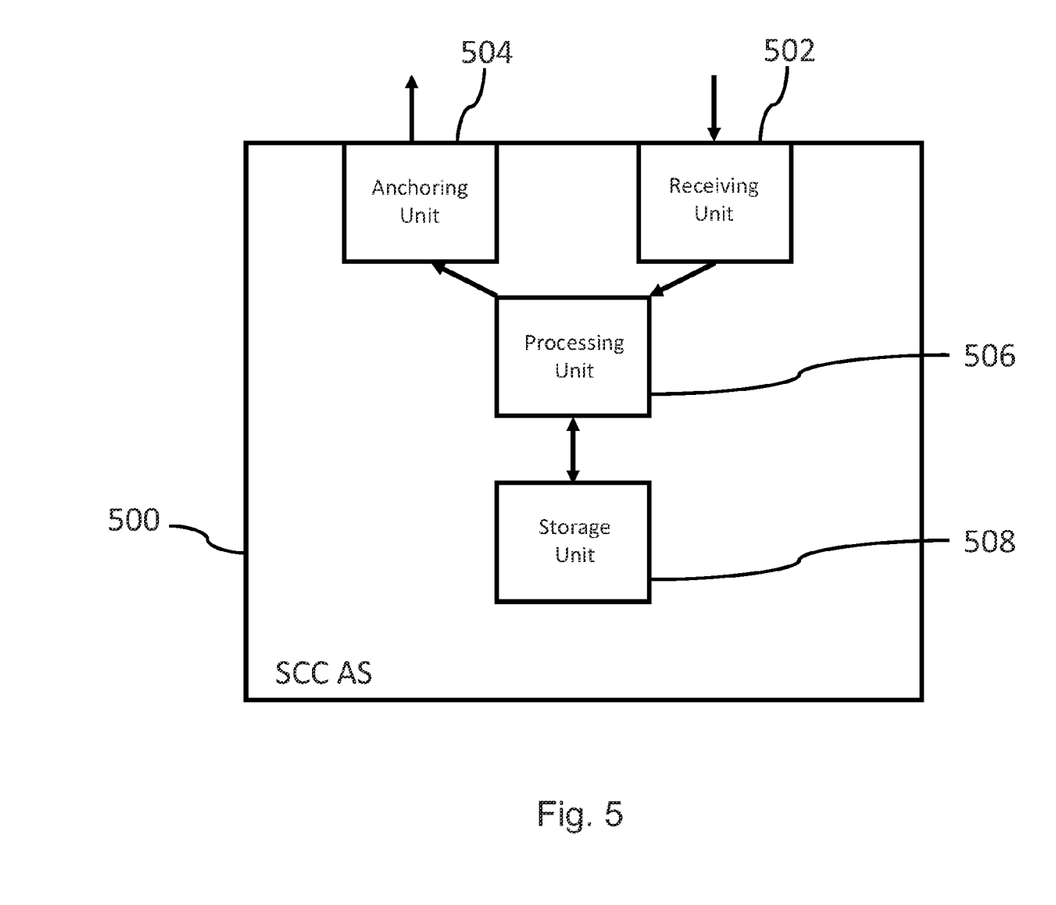
FIG. 5 is a block diagram illustrating a constitution of a Service Centralization and Continuity Application Server according to an exemplary embodiment of the invention.

FIG. 5 illustrates a constitution of a control node 500 for anchoring a packet switched session of a subscriber according to an exemplary embodiment of the invention. The control node 500 is adapted as an application server, particularly a SCC AS of a home network of a subscriber.

The control node 500 comprises a receiving unit 502 for receiving a packet switched request for a session setup particularly from a subscriber and an anchoring unit 504 for anchoring the packet switched session in a control node of a visited network of the subscriber.

The anchoring unit 504 is adapted to anchor signaling for the packet switched session in the control node of the home network. The control node 500 may comprise a further anchoring nit for performing the latter.

The anchoring unit 504 is further adapted to identify he control node of the visited network.

The anchoring unit 504 is adapted for sending information to the control node of the visited network for anchoring the packet-switched session in the control node of the visited network and media in a transmission node of the visited network. The anchoring unit 504 may be adapted as a sender.

The control node 500 comprises a processing unit 506, particularly a processor, in which appropriate algorithms may be executed to perform the method for anchoring a packet switched session of a subscriber and/or of performing a handover of a session of a subscriber from a packet switched access to a circuit switched access. The anchoring 504 unit may be at least partly part of the processing unit 506.

The control node 500 comprises a storage unit 508 for storing information necessary during performing the method for anchoring a packet switched session of a subscriber and/or of performing a handover of a session of a subscriber from a packet switched access to a circuit switched access.

Figure 6:
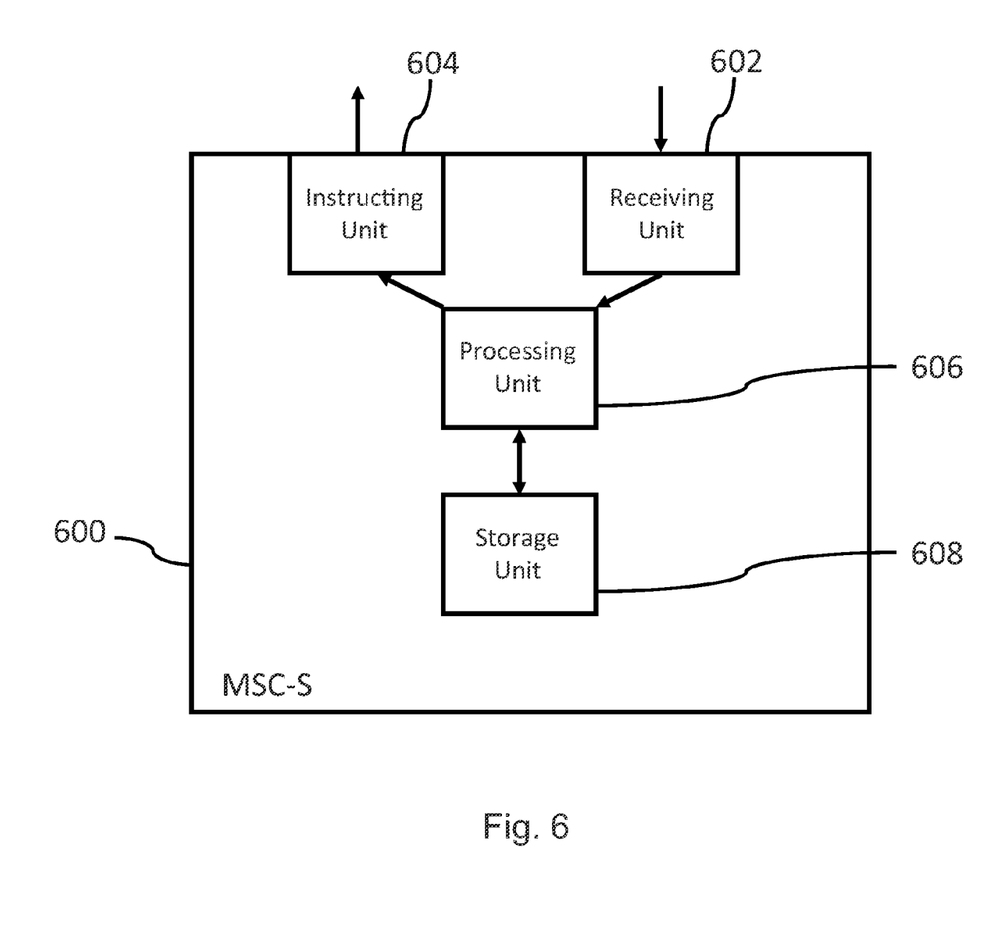
FIG. 6 is a block diagram illustrating a constitution of a Mobile Switching Centre Server according to an exemplary embodiment of the invention.

FIG. 6 illustrates a constitution of a control node 600 for performing a handover of a session of a subscriber from a packet switched access to a circuit switched access. The control node 600 is adapted as a Mobile Switching Center Server MSC-S.

The control node 600 comprises a receiving unit 602 for receiving a handover request and an instructing unit 604 for instructing a transmission node, particularly a Media Gateway, to transfer a source access leg of the session associated with the packet switched access to a target access leg of the session associated with the circuit switched access.

The instructing unit 604 is adapted to send information particularly related to execute the method of performing a handover of a session of a subscriber from a packet switched access to a circuit switched access.

The control node 600 comprises a processing unit 606, particularly a processor, in which appropriate algorithms may be executed to perform the methods of anchoring a packet switched session of a subscriber and/or of performing a handover of a session of a subscriber from a packet switched access to a circuit switched access. The instructing 604 unit may be at least partly part of the processing unit 606.

The control node 600 comprises a storage unit 608 for storing information necessary during performing the methods of anchoring a packet switched session of a subscriber and/or of anchoring a packet switched session of a subscriber.

The control node 600 may be located in a visited network of the subscriber.

The control node 600 may comprise a visited access transfer function VATF.

A transmission node or a transfer node may be adapted as a Media Gateway MGW which may be located in a visited network of a subscriber. The transmission node may comprise a Multimedia Resource Function (MRF).

A mobility management node may be adapted as a Mobility Management Entity MME which may be located in a visited network of a subscriber. The mobility management node may comprise a MSC server selection function (MSF).

Modifications and other embodiments of the disclosed invention will come to mind to one skilled in the art having the benefit of the teachings presented in the foregoing description and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

Abbreviations
BICC Bearer Independent Call Control
BSS Base Station Subsystem
C-MSISDN Correlation Mobile Station International ISDN Number
CS Circuit Switched
DSL Digital Subscriber Line
EPC Evolved Packet Core
EUTRAN evolved Universal Terrestrial Radio Access Network
GERAN GSM EDGE Radio Access Network
3GPP Third Generation Partnership Project
GSM Global System for Mobile Communication
HLR Home Location Register
HO Handover
HSS Home Subscriber Server
ICS IMS Centralized Services
iFC initial Filter Criteria
IMS IP Multimedia Subsystem
IMSI International Mobile Subscriber Identity
IP Internet Protocol
LAI Location Area Identity
ISUP ISDN User Part
ISDN Integrated Services Digital Network
LTE Long Tem Evolution
MGCF Media Gateway Control Function
MGW Media Gateway
MME Mobile Management Entity
MSF MSC Selection Function
MRFP Media Resource Function Processor
MSC Mobile Switching Centre
MSC-S Mobile Switching Centre Server
MSRN Mobile Station Roaming Number
P-CSCF Proxy Call Server Control Function
P-GW Packet Gateway
PS Packed Switched
PSI Public Service Identity
RNC Radio Network Controller
RTP Real Time Protocol
SCC AS Service Centralization and Continuity Application Server
S-CSCF Serving Call Server Control Function
SDP Session Description Protocol
S-GW Serving Gateway
SIP Session Initiated Protocol
SR-VCC Single Radio-Voice Call Continuity
UE User Equipment
UTRAN Universal Terrestrial Radio Access Network
VATF Visited Access Transfer Function
VLR Visitor Location Register
VLR TMSI (Visitor Location Register) Temporary Mobile Subscriber Identity
VoIP Voice over IP WCDMA Wideband Code Division Multiple Access
WLAN Wireless Local Area Network

The invention claimed is:

1. A method of anchoring a packet switched session of a subscriber of a visited network, the method comprising:
   receiving from the subscriber, a packet switched request for a setup of the packet switched session setup; and
   anchoring the packet switched session from an IP Multimedia Subsystem (IMS) control plane point of view in a control node of the visited network of the subscriber, wherein the control node in which the packet switched session is anchored is located in a circuit-switched core network of the visited network, wherein said anchoring comprises sending information to the control node of the visited network for anchoring the packet switched session in that control node and for anchoring a media path in a transmission node of the visited network, said information comprising at least one of Correlation Mobile Station International Number (C-MSISDN), an International Mobile Subscriber Identity (IMSI), and a media description.

2. The method according to claim 1, wherein the method is executed by a control node of a home network of the subscriber.

3. The method according to claim 1, wherein said sending comprises forwarding information about the setup to the control node of the visited network.

4. The method according to claim 1, wherein the method comprises anchoring a signaling path for the packet-switched session in the control node of the visited network.

5. The method according to claim 1, wherein said anchoring comprises identifying the control node of the visited network.

6. The method according to claim 5, wherein said identifying comprises at least one of:
   using a configured Public Service Identifier (PSI) of the control node of the visited network; and
   requesting information about the control node of the visited network from a home network of the subscriber.

7. The method according to claim 6, wherein said requesting comprises requesting a Mobile Station Roaming Number (MSRN) from at least one of a Home Location Register (HLR) and a Home Subscriber Server (HSS) of the home network.

8. A control node for anchoring a packet switched session of a subscriber, the control node comprising:
   a receiving circuit configured to receive, from the subscriber, a packet switched request for a setup of the packet switched session, and
   an anchoring circuit configured to anchor the packet switched session from an IP Multimedia Subsystem (IMS) control plane point of view in a control node of the visited network of the subscriber, by sending information to the control node of the visited network for anchoring the packet switched session in that control node and for anchoring a media path in a transmission node of the visited network, said information comprising at least one of Correlation Mobile Station International Number (C-MSISDN), an International Mobile Subscriber Identity (IMSI), and a media description, wherein the control node in which the packet switched session is anchored is located in a circuit-switched core network of the visited network.

9. The control node according to claim 8, wherein control node that comprises said receiving circuit and said anchoring circuit comprises a Service Centralization and Continuity Application Server (SCC AS) of a home network of the subscriber.

10. The control node according to claim 8, wherein the anchoring circuit is configured to anchor a signaling path for the packet switched session in the control node of the visited network.

11. The control node according to claim 8, wherein the anchoring circuit is configured to identify the control node of the visited network.

12. A method of performing a handover of a session of a subscriber of a visited network from a packet switched access to a circuit switched access, the method comprising:
   receiving information for anchoring the packet switched session from an IP Multimedia Subsystem (IMS) control plane point of view in a control node of the visited network and for anchoring a media path in a transmission node of the visited network, wherein the control node in which the packet switched session is anchored is located in a circuit-switched core network of the visited network, said information comprising at least one of Correlation Mobile Station International Number (C-MSISDN), an International Mobile Subscriber Identity (IMSI), and a media description,
   receiving an handover request, and
   instructing the transmission node to transfer a source access leg of the session associated with the packet switched access to a target access leg of the session associated with the circuit switched access.

13. The method according to claim 12, wherein the method is executed by the control node of the visited network of the subscriber.

14. A control node for performing a handover of a session of a subscriber of a visited network from a packet switched access to a circuit switched access, the control node comprising:
   a receiving circuit configured to:
      receive information for anchoring the packet switched session from an IP Multimedia Subsystem (IMS) control plane point of view in a control node of the visited network and for anchoring a media path in a transmission node of the visited network, wherein the control node in which the packet switched session is anchored is located in a circuit-switched core network of the visited network, said information comprising at least one of Correlation Mobile Station International Number (C-MSISDN), an International Mobile Subscriber Identity (IMSI), and a media description, and
      receive an handover request, and
   an instructing circuit configured to instruct the transmission node to transfer a source access leg of the session associated with the packet switched access to a target access leg of the session associated with the circuit switched access.

15. The control node according to claim 14, wherein the control node that comprises the receiving circuit and the instructing circuit comprises a Mobile Switching Centre Server (MSC-S).

16. The control node according to claim 14, wherein the control node that comprises the receiving circuit and the instructing circuit comprises a visited access transfer function (VAFT).

17. The control node according to claim 14, wherein the control node that comprises the receiving circuit and the instructing circuit comprises the control node of the visited network of the subscriber.

18. The method of claim 12, further comprising using said information to correlate the session with the handover request.

19. The control node of claim 14, further comprising a processing circuit configured to use said information to correlate the session with the handover request.

20. A method of anchoring a packet switched session of a subscriber of a visited network, wherein the method comprises:
anchoring the packet switched session from an IP Multimedia Subsystem (IMS) control plane point of view in a control node of the visited network of the subscriber, wherein the control node in which the packet switched session is anchored is located in a circuit-switched core network of the visited network, wherein said anchoring comprises the control node of the visited network receiving information for anchoring the packet switched session in the control node of the visited network and for anchoring a media path in a transmission node of the visited network, wherein said information comprises at least one of a Correlation Mobile Station International Number (C-MSISDN), an International Mobile Subscriber Identity (IMSI), and a media description.

21. A control node of a visited network for anchoring a packet switched session of a subscriber of the visited network, wherein the control node comprises:
an anchoring circuit configured to anchor the packet switched session from an IP Multimedia Subsystem (IMS) control plane point of view in the control node of the visited network, wherein the control node in which the packet switched session is anchored is located in a circuit-switched core network of the visited network, wherein said anchoring comprises the control node of the visited network receiving information for anchoring the packet switched session in that control node and for anchoring a media path in a transmission node of the visited network, wherein said information comprises at least one of a Correlation Mobile Station International Number (C-MSISDN), an International Mobile Subscriber Identity (IMSI), and a media description.

22. The method according to claim 1, wherein the packet switched session is a session on a Session Initiation Protocol (SIP) level.

23. The method according to claim 1, wherein said anchoring comprises including the control node of the visited network in a Session Initiation Protocol (SIP) signaling path during setup of the packet switched session.

24. The method according to claim 1, wherein said anchoring comprises co-locating a Visited Access Transfer Function (VATF) with a Mobile Switching Center Server (MSC-S).

25. The method according to claim 1, wherein at least one of:
the control node of the visited network of the subscriber comprises a Mobile Switching Centre Server (MSC-S), such that the packet switched session is anchored in said MSC-S; and
the method is executed by a Service Centralization and Continuity Application Server (SCC AS) of a home network of the subscriber.

26. The method according to claim 1, wherein the packet switched session is a normal IMS session.

27. The method according to claim 12, wherein at least one of:
the control node of the visited network of the subscriber comprises a Mobile Switching Centre Server (MSC-S), such that the packet switched session is anchored in said MSC-S; and
said receiving comprises receiving the information from a Service Centralization and Continuity Application Server (SCC AS) of a home network of the subscriber.

28. The method according to claim 12, wherein the packet switched session is a normal IMS session.

29. The method according to claim 20, wherein the control node of the visited network of the subscriber comprises a Mobile Switching Centre Server (MSC-S), such that the packet switched session is anchored in said MSC-S.

30. The control node of claim 8, wherein the control node of the visited network of the subscriber comprises a Mobile Switching Centre Server (MSC-S), such that the packet switched session is anchored in said MSC-S.

31. The control node of claim 14, wherein the control node of the visited network of the subscriber comprises a Mobile Switching Centre Server (MSC-S), such that the packet switched session is anchored in said MSC-S.

32. The method of claim 20, wherein the control node of the visited network of the subscriber comprises a Mobile Switching Centre Server (MSC-S), such that the packet switched session is anchored in said MSC-S.

33. The control node of claim 21, wherein the control node of the visited network of the subscriber comprises a Mobile Switching Centre Server (MSC-S), such that the packet switched session is anchored in said MSC-S.

* * * * *

UNITED STATES PATENT AND TRADEMARK OFFICE
CERTIFICATE OF CORRECTION

PATENT NO. : 9,294,964 B2
APPLICATION NO. : 12/943310
DATED : March 22, 2016
INVENTOR(S) : Ralf Keller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this
Second Day of August, 2016

Michelle K. Lee
*Director of the United States Patent and Trademark Office*